Oct. 31, 1961     F. KULCSAR     3,006,857
FERROELECTRIC CERAMIC COMPOSITION
Filed April 13, 1959
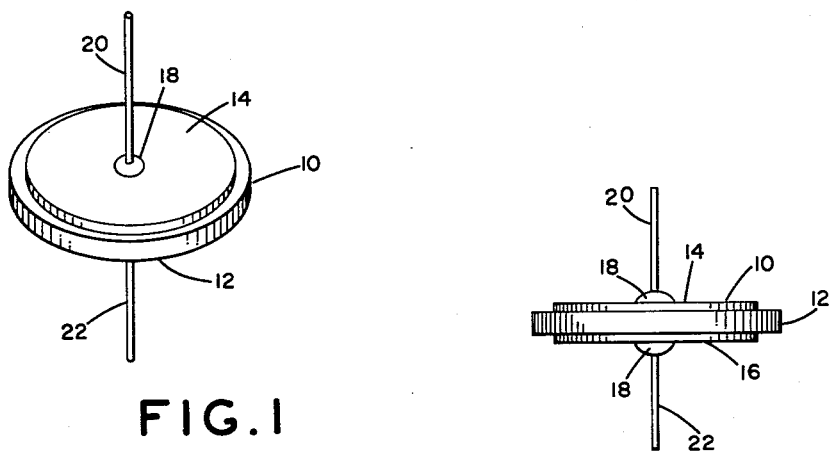
FIG.1
FIG.2
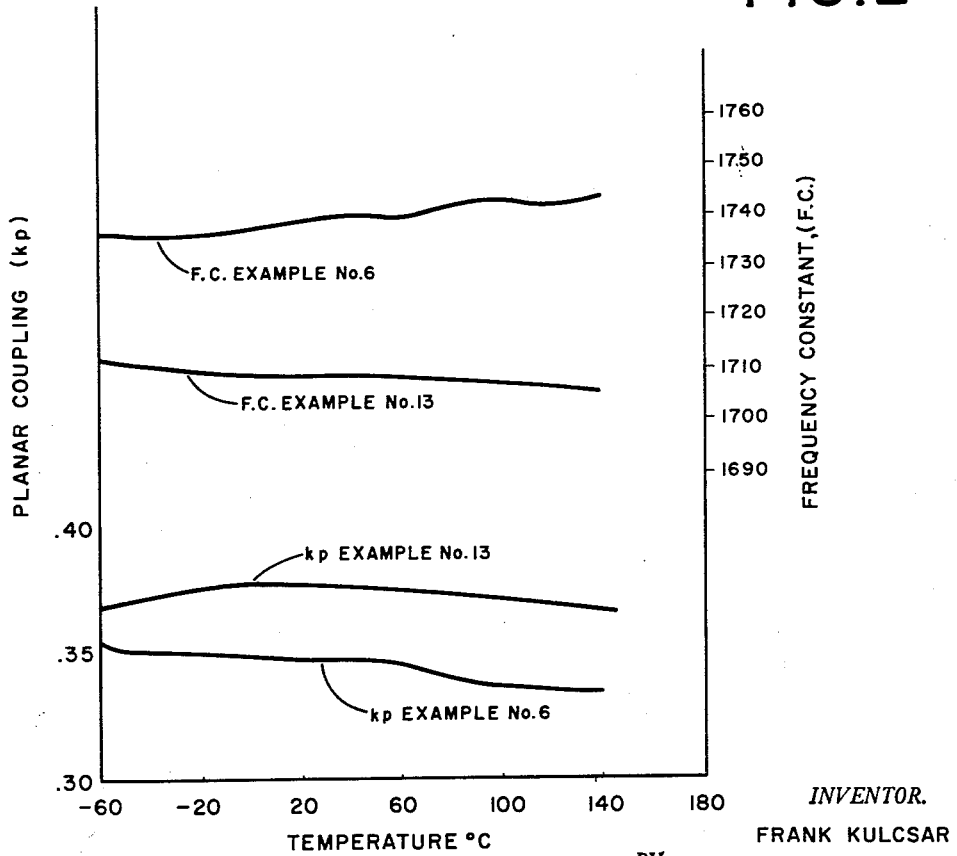
FIG.3
INVENTOR.
FRANK KULCSAR
BY
ATTORNEY 3,006,857
FERROELECTRIC CERAMIC COMPOSITION
Frank Kulcsar, Fairview Park, Ohio, assignor to Clevite Corporation, Cleveland, Ohio, a corporation of Ohio
Filed Apr. 13, 1959, Ser. No. 805,985
15 Claims. (Cl. 252—62.9)

This invention relates broadly to compositions of matter and articles of manufacture fabricated therefrom. More particularly, the invention pertains to novel ferroelectric ceramics which are polycrystalline aggregates of certain constituency, as hereinafter described, fired to ceramic maturity and thereafter polarized or capable of being polarized to impart thereto electromechanical transducing properties similar to the well-known piezoelectric effect. The invention also encompasses the unreacted physical mixtures of raw ingredients which are the precursors of such ceramic materials, the reacted product of such mixtures and the articles of manufacture such as electromechanical transducers fabricated from the matured ceramic. It will be understood that the term "ceramic compositions" as used hereinafter is intended to encompass unreacted physical mixtures as well as reacted mixtures and the matured ceramic which is the ultimate product.

This application is a continuation-in-part of applicant's abandoned application Serial Number 686,937, filed September 30, 1957, and assigned to the same assignee as the present invention.

Because of their potentially lower cost and their greater durability under adverse atmospheric conditions, ferroelectric ceramic materials have come into prominence in recent years as substitutes for crystals in various transducer applications in the production, measurement and/or sensing of sound, shock, vibration, pressures, etc. Among the more promising ceramics for this purpose is lead zirconate titanate, a polycrystalline material composed of $PbZrO_3$ and $PbTiO_3$ effectively in solid solution. In certain ranges of composition on the basis of mol percentages of its constituents, lead zirconate titanate exhibits highly desirable electrical and mechanical properties, particularly, when electrostatically prepolarized, a high electromechanical coupling. These ranges and examples of preferred compositions and their properties are disclosed with particularity in U.S. Letters Patent No. 2,708,244, issued on May 10, 1955, to Bernard Jaffe.

It has been found that these ceramic materials have important advantages in the fabrication of piezoelectric resonators of the type employed in electromechanical wave filters such as disclosed in copending applications Serial Number 610,103, filed September 17, 1956, and now abandoned, and Serial Number 633,052, filed January 8, 1957, now U.S. Patent No. 2,877,432, both of which are assigned to the same assignee as the present invention.

It is well understood by those skilled in the art that the satisfactory utilization of piezoelectric materials in wave-filter applications imposes exacting requirements on such materials above and beyond those ordinarily sought for transducer applications.

The more important of these unique desiderata are time and/or temperature stability of electrical and physical properties of the material, principally the frequency constant but also the electromechanical coupling, mechanical Q and dielectric constant. Thus, while conventional piezoelectric ceramic materials are admirably suited in most respects to use in electromechanical filter resonators, they suffer from the disability that their characteristic frequency constant, coupling coefficient and other properties change with the passage of time (this phenomenon is known as and will be referred to as "aging") and vary with temperature. While the time- and/or temperature- induced variations are relatively small in some cases it will be appreciated that, for filter applications, such variations must be eliminated entirely or reduced to negligible proportions.

The present invention contemplates improved ferroelectric polycrystalline ceramic compositions comprising at least about 95 percent by weight of lead, titanium, and zirconium in oxidic form in proportions corresponding to lead titanate and lead zirconate in mol ratios ranging from 60:40 to 45:55, up to about 20 atom percent of the lead in said lead zirconate and lead titanate being replaced by strontium and/or calcium, said compositions containing an addition of at least one element from the group consisting of chromium and uranium, the aggregate quantity of the addition, adjusted in accordance with the respective atomic weights of the elements of said group, corresponding on a mol basis to an addiiton of about 0.1 to 1.5 weight percent of chromium oxide ($Cr_2O_3$).

It is the fundamental object of the present invention to provide novel and improved piezoelectric ceramic materials which overcome at least one of the problems outlined above.

A more specific object of the invention is to provide improved polycrystalline ceramics characterized by high relative permittivity and piezoelectric response, and a stable frequency constant over a relatively wide range of operating temperatures.

It is a further object of the invention to provide new and useful ferroelectric ceramic materials characterized by desirable electrical, electromechanical and physical properties which are less susceptible to decay or variation with age and/or temperature than comparable conventional materials.

Another object is the provision of ceramic materials combining high piezoelectric effect with a high dielectric constant.

A still further object of the invention is the provision of improved time and temperature stable ferroelectric ceramic materials particularly suited for use as resonators in electromechanical wave filters.

These and other objects of the invention and the manner of their attainment will be readily apparent to those conversant with the art from a reading of the following description and subjoined claims in conjunction with the annexed drawing, in which, FIG. 1 is a perspective elevational view of an electromechanical transducer embodying the present invention;

FIG. 2 is a side elevational view of the transducer shown in FIG. 1;

FIG. 3 is a graphic representation of the effect of temperature variation on frequency constant and the planar coupling coefficient ($k_p$) of exemplary compositions according to the present invention.

Before proceeding with a detailed description of the ferroelectric ceramic materials contemplated by the invention, their applications in electromechanical transducers will be described with reference to FIGURES 1 and 2 of the drawings wherein reference character 10 designates, as a whole, an electromechanical transducer having, as its active element, a preferably disc-shaped body 12 of a piezoelectric ceramic material according to the present invention.

Body 12 is electrostatically polarized, in a manner hereinafter set forth, and is provided with a pair of electrodes 14 and 16, applied in a suitable manner, on two opposed surfaces thereof. Conductively attached to the electrodes 14 and 16, as by solder 18, are respective wire leads 20 and 22 operative to connect the transducer in the electrical or electronic circuit, not shown, in which it is to be employed. As well known in the art, an electromechanical transducer operates to convert applied electrical energy to mechanical energy, and vice versa. Therefore, if the ceramic body is subjected to mechanical stresses, the resulting strain generates an electrical output appearing as a voltage across the leads 20, 22. Conversely, a voltage applied across the leads produces a strain or mechanical deformation of ceramic body 12. It is to be understood that the term electromechanical transducer as used herein is taken in its broadest sense and includes particularly piezoelectric filter elements, frequency control devices, and the like, and that the invention may also be used and adapted to various other applications requiring materials having dielectric, piezoelectric and/or electrostrictive properties.

For the sake of clarity and ease of description, the constituents of compositions according to the invention may be categorized as "principal" and "secondary," the former term applying to those making up a major fraction of the whole composition and the latter making up a minor fraction. The principal ingredients, then, are lead titanate and lead zirconate. The secondary ingredients comprise from zero to 20 atom percent, in the aggregate, of calcium and/or strontium, which may be substituted for an equivalent quantity of the lead in the principal ingredients, and an addition of at least one element from the group consisting of chromium and uranium, the aggregate quantity of the addition, adjusted in accordance with the respective atomic weights of the elements of said group, corresponding on a mol basis, to an addition of about 0.1 to 1.5 weight percent of chromium oxide ($Cr_2O_3$). Thus, where the addition is to be the element chromium and the addition compound is to be $Cr_2O_3$, the quantity, of course, would be from 0.1 to 1.5 weight percent. If the heavier element uranium is used, the quantity in weight percent would be proportionately higher in order to provide the same number of uranium atoms as there are chromium atoms in 0.1 to 1.5 weight percent $Cr_2O_3$.

The quantity of the addition may also be expressed on an atom basis, i.e., as a ratio of the total number of atoms of chromium and/or uranium to the number of atoms of lead or, where there is replacement of lead by Sr and/or Ca, to the combined number of lead and substituent atoms. On this basis the aggregate quantity of chromium and/or uranium is from a minimum of about 4 atoms per 1000 atoms of lead and substituents to a maximum of about 65 atoms per 1000. For additions of $Cr_2O_3$ to compositions having no substituents for lead, this corresponds to about 0.1 to 1.5 weight percent respectively. Where there is a substitution of Sr and/or Ca for lead, a slight adjustment of the equivalent weight percent is necessary to compensate for the lower atomic weights of Sr and Ca.

For purposes of simplification, the principal ingredients will be considered as basic compositions to which the secondary ingredients are added as direct additions or as substituents. It will be understood, however, that compositions according to the present invention may be formulated from various starting materials and intermediates.

As will be appreciated by those conversant with the art, hafnium occurs as an impurity in varying amounts in zirconium; for the purposes of the invention, hafnium may be regarded as the substantial equivalent of zirconium and the presence of hafnium either as an impurity or as a substituent for zirconium is acceptable. However, because the high relative cost of hafnium as compared to zirconium renders its use uneconomic in commercial manufacture of the compositions under discussion, the present description will disregard the possible presence of hafnium.

As previously mentioned, the principal ingredients of ceramic compositions according to the present invention are lead zirconate and lead titanate which are present in mol ratios of 60:40 to 45:55 and jointly make up at least about 95 weight percent of the whole. The preferred mol ratios ($PbZrO_3:PbTiO_3$) are those in the range 55:45 to 50:50 which are near the morphotropic phase boundary described by B. Jaffe in his aforementioned U.S. Letters Patent Number 2,708,244.

The lead zirconate-lead titanate compositions described above may, if desired, be modified by the addition of calcium and/or strontium as substituents for a part of the lead. This substitution is on an atom percentage basis up to a maximum aggregate quantity of 20 atom percent of calcium and/or strontium, with a preferred range of 2 to 10 percent. Further details, examples, and physical and electrical properties of the basic compositions containing calcium and/or strontium may be had by reference to U.S. Letters Patent No. 2,906,710, issued on application Serial Number 527,720, filed on August 11, 1955, in the names of F. Kulcsar and C. G. Cmolik and assigned to the same assignee as the present invention.

In accordance with the present invention novel and improved ferroelectric ceramic compositions comprise basic compositions as described above, with or without substitution of calcium and/or strontium for lead, and containing an addition of at least one element from the group consisting of chromium and uranium, the aggregate quantity of the addition, adjusted in accordance with the respective atomic weights of the elements of said group, corresponding on a mol basis to an addition of about 0.1 to 1.5 weight percent of chromium oxide ($Cr_2O_3$).

The compositions proposed may be prepared in accordance with various ceramic procedures which, in themselves, are well known in the art. Two fundamental variations possible are (1) compounding the basic compositions (including the optional substitution of calcium and/or strontium for lead) to make a master mix to which the chromium and/or uranium components may be added in the desired proportions; (2) combining all component ingredients, in suitable form, at the outset.

The preferred method of preparing the basic compositions involves the use of lead oxide (PbO), zirconia ($ZrO_2$) and titania ($TiO_2$), all of relatively pure grade (e.g., C.P. grade), combined in proper proportions. If strontium and/or calcium are to be used, these are added in the form of a reasonably reactive compound. The carbonates of these alkaline earth metals are preferred because of their ready commercial availability at relatively low cost and in suitable purity. The combined ingredients are then wet or dry milled to achieve thorough mixing and comparatively uniform particle size. In milling the mixture care should be exercised to avoid, or the proportions of ingredients varied to compensate for, contamination by wear of the milling balls or stones. Thus, for example, if titania balls are used in the mill, their weight loss should be empirically determined and the proportions of the mixture adjusted (in this case by decreasing the titania) to allow for the titania introduced through ball wear. The invention, however, is not concerned with the specific means or methods by which the proper proportions in and reproducibility of the final product are achieved and accordingly the ranges given in this description and in the subjoined claims are those desired or intended, exclusive of impurities in the raw materials, assuming that suitable precautions are taken in the preparation to avoid, control and/or compensate for contamination.

After the first milling, the mixture is dried (if wet milled) and reground briefly to assure as homogeneous a mixture as possible. At this stage the chromium and/or uranium, preferably in oxidic form, and in suitable proportions, are thoroughly admixed.

At this juncture it is pointed out that the additions of the chromium and uranium may be balanced with additional lead. For example, if chromium oxide ($Cr_2O_3$) is added, a quantity of lead oxide (PbO) may be added sufficient to give the stoichiometric proportions for lead chromate ($PbCrO_4$). Alternatively, the addition may be in the form of lead chromate rather than its component oxides. The additions may be unbalanced or only partially balanced. In any event, the percentage weight of the addition is computed, taking into account the respective molecular weights of the compounds used, to give a total molar quantity corresponding to 0.1 to 1.5 weight percent of chromium oxide ($Cr_2O_3$) as hereinabove explained.

After the chromium and/or uranium addition, the mixture, either loose or suitably formed into desired shapes, is pre-reacted by sintering at a temperature of around 850° C. for approximately 2 hours. It is desirable to control loss of lead during the heating by suitable means, such as by carrying out the sintering in an enclosure containing a source of lead oxide vapor as suggested by S. Roberts (Jour. Am. Cer. Soc. 33 (2), 63 (1950)). The specific conditions of sintering will, of course, depend on such variable factors as the size and shape of the batch, and may be selected in accordance with established ceramic techniques to suit the particular case, the object being to approach, as closely as possible, a complete reaction of the mixture.

Following the pre-sintering, the reacted material is allowed to cool and is then crushed and milled to an average particle size of about 1½ microns. Once again, suitable precautions should be exercised to avoid, control and/or compensate for ball wear contamination during milling. When milling is completed, the pre-sintered mixture is ready for forming into the desired shapes and firing to maturity. Depending on preference and the shapes desired, the material may be formed into a mix or slip suitable for pressing, slip casting, or extruding, as the case may be, in accordance with conventional ceramic procedures.

The samples for which data are given hereinbelow were prepared by admixing with 100 grams of the milled pre-sintered mix, 3 cc. of a bonding and lubricating agent consisting of equal parts by volume of water and Ceremul C. Ceremul C is a commercially available product consisting of an aqueous dispersion (41 to 46% solids) of paraffin (M.P. 122° F.). The mix was then pressed into discs, roughly 1-inch in diameter and 2 to 3 mm. thick, which were fired to maturity at a temperature around 1280° C. for about 45 minutes, with suitable precautions taken to avoid or control loss of lead components through volatilization.

The fired shapes may then be polarized in a manner well known in the art, for example, by applying a pair of electrodes (e.g., 14, 16, FIGURES 1 and 2) to opposite faces of the ceramic bodies and applying an electrostatic field to the electrodes. While the particular conditions of polarization may be varied as desired, D.C. field strengths of 150 to 175 volts per mil at room temperature have given satisfactory results. Another method of polarizing, utilized to pole the ceramic bodies on which data are hereinafter presented, is disclosed and claimed in U.S. Letters Patent 2,928,163, issued on application Serial Number 527,712, filed August 11, 1955, and assigned to the same assignee as the present invention.

After poling, the ceramic units preferably are subjected to a heat treatment to reduce thermal hysteresis. This treatment consists of repeated quenching of the pieces from 250° C. into a room temperature oil bath. The quenching treatment usually produces a small decrease in coupling coefficient; however, because of the relative high coupling coefficient of the material initially, the reduction is not detrimental and, in some cases, is even desirable for certain wave filter applications.

Examples of specific ceramic compositions according to this invention and various pertinent electrical and electromechanical properties thereof are given in the following table in which weight percent is abbreviated as "W%":

Table I

| Ex. No. | Composition | 24 hours after poling ||||||
|---|---|---|---|---|---|---|---|
| | | Dielectric constant K, at 1 kc. p.s. | Dissipation, D, in percent at 1 kc. p.s. | Anti-resonant frequency $F_A$ (kc.) | Resonant frequency $F_R$ (kc.) | Planar coupling $k_p$ | Mechanical Q ($Q_m$) |
| 1 | $Pb(Zr_{0.54}Ti_{0.46})O_3 + 1\ W\%\ U_3O_8$ | 574 | 1.4 | [1] 145.495 | [1] 134.804 | 0.42 | [1] 387 |
| 2 | $Pb(Zr_{0.54}Ti_{0.46})O_3 + 0.5\ W\%\ Cr_2O_3$ | 882 | 1.5 | 155.931 | 141.527 | 0.47 | 338 |
| 3 | $Pb(Zr_{0.54}Ti_{0.46})O_3 + 1.0\ W\%\ Cr_2O_3$ | 580 | 1.7 | [a] 151.668 | [a] 144.675 | [a] 0.40 | [a] 463 |
| 4 | $Pb(Zr_{0.54}Ti_{0.46})O_3 + 0.6\ W\%\ Cr_2O_3^b$ | 755 | 2.11 | 159.812 | 147.064 | 0.44 | 290 |
| 5 | $Pb(Zr_{0.54}Ti_{0.46})O_3 + 0.7\ W\%\ Cr_2O_3^b$ | 757 | 2.53 | 159.036 | 145.848 | 0.45 | 247 |
| 6 | $Pb(Zr_{0.54}Ti_{0.46})O_3 + 0.75\ W\%\ Cr_2O_3^c$ | 790 | 1.77 | 155.090 | 146.642 | 0.367 | 419 |
| 7 | $Pb(Zr_{0.54}Ti_{0.46})O_3 + 0.8\ W\%\ Cr_2O_3^b$ | 796 | 2.61 | 159.787 | 147.410 | 0.435 | 251 |
| 8 | $Pb(Zr_{0.54}Ti_{0.47})O_3 + 0.8\ W\%\ Cr_2O_3^b$ | 894 | 2.20 | 161.123 | 147.461 | 0.455 | 294 |
| 9 | $Pb(Zr_{0.55}Ti_{0.45})O_3 + 0.8\ W\%\ Cr_2O_3^b$ | 621 | 2.44 | 160.982 | 147.850 | 0.447 | 255 |
| 10 | $Pb(Zr_{0.54}Ti_{0.46})O_3 + 0.9\ W\%\ Cr_2O_3^b$ | 810 | 2.09 | 157.782 | 146.196 | 0.424 | 257 |
| 11 | $Pb(Zr_{0.54}Ti_{0.46})O_3 + 1.25\ W\%\ Cr_2O_3^c$ | 733 | 2.31 | 150.165 | 143.300 | 0.337 | 343 |
| 12 | $Pb_{0.95}Sr_{0.05}(Zr_{0.53}Ti_{0.47})O_3 + 0.7\ W\%\ Cr_2O_3$ | 812 | 1.84 | 169.538 | 161.026 | 0.353 | 395 |
| 13 | $Pb_{0.95}Sr_{0.05}(Zr_{0.53}Ti_{0.47})O_3 + 0.7\ W\%\ Cr_2O_3^b$ | 1,050 | 2.08 | 159.106 | 146.889 | 0.434 | 310 |
| 14 | $Pb_{0.95}Sr_{0.05}(Zr_{0.53}Ti_{0.47})O_3 + 1.0\ W\%\ Cr_2O_3$ | 895 | 2.58 | 168.792 | 160.741 | 0.344 | 236 |
| 15 | $Pb_{0.95}Sr_{0.05}(Zr_{0.53}Ti_{0.47})O_3 + 1.0\ W\%\ Cr_2O_3^b$ | 888 | 2.43 | 160.633 | 152.623 | 0.352 | 363 |
| 16 | $Pb_{0.95}Ca_{0.05}(Zr_{0.53}Ti_{0.47})O_3 + 0.7\ W\%\ Cr_2O_3^b$ | 942 | 2.20 | 160.204 | 152.474 | 0.346 | 438 |

[1] After 622 days.
[a] 19 days after poling.
[b] Partially balanced with PbO.
[c] Balanced with PbO as $PbCrO_4$.

From the foregoing table it will be readily evident that all the exemplary compositions are characterized by good planar couplings, relatively high dielectric constants and mechanical Q values. The compositions indicate that increasing amounts of chromium addition do not profoundly effect the physical or electrical properties of the ceramic. However, additions corresponding to less than 0.1 weight percent $Cr_2O_3$ are not effective to impart time and/or temperature stability and amounts over 1.5 weight percent decrease the resistivity of the ceramic to an objectionable degree, i.e., to the extent that conduction and shorting occur during poling. Regarding the effect of balancing the additions with lead oxide (PbO), it has been found that complete or partial balancing is desirable, particularly with additions of 1 weight percent or more, because it inhibits cracking of the ceramic during firing, a problem encountered when the additions are not balanced. The extent of balancing does not appear to effect the mechanical or electrical properties of the ceramic and is not critical.

The dissipation factor given in the table is that measured at 1 kc. p.s.; this factor is drastically lower at higher frequencies. For example, the percent D of Example No. 13 at 300 kc. p.s. is only 0.26%.

Referring now to FIGURE 3, the temperature dependence of typical compositions according to the present invention are graphically depicted. From the plotted curves it will be readily apparent the change in frequency constant and planar coupling is very slight over a wide range of temperatures (−60 to 140° C.).

The aging characteristics of these compositions are likewise excellent. Thus, for example, in 22 weeks, the antiresonant frequency ($F_A$) of Example No. 2, showed a change (decrease) of only 0.023% while the resonant frequency ($F_R$) increased only 0.116%.

Additional aging data for this composition and for Example Nos. 6 and 13 are given in the following table which includes, for comparison, data on a conventional (unmodified) lead titanate zirconate composition (Example 0), viz., $Pb(Zr_{53}Ti_{47})O_3$:

*Table II*

| Ex. No. | Aging [1] time (weeks) | Percent change | | | |
|---|---|---|---|---|---|
| | | K | $F_A$(kc.) | $F_R$(kc.) | $k_p$ |
| 0 | 16 | −4.2 | (²) | +0.84 | −1.9 |
| 2 | 22 | +0.14 | −0.023 | +0.116 | −0.65 |
| 6 | 16 | −0.2 | +0.013 | +0.063 | −0.27 |
| 13 | 12 | +0.25 | +0.006 | +0.060 | −0.29 |

[1] Not including first 4–5 weeks after poling.
² Data not available.

In addition to the advantageous properties outlined above, compositions according to the present invention yield ceramics of good physical quality and which polarize well.

While there have been described what at present are considered to be the preferred embodiments of the invention, it will be obvious to those skilled in the art that various changes and modifications can be made therein without departing from the invention, and it is aimed, therefore, in the appended claims to cover all such changes and modifications as fall within the true spirit and scope of the invention.

What is claimed is:

1. A ferroelectric ceramic composition consisting essentially of lead zirconate and lead titanate in a mol ratio of from 60:40 to 45:55 and containing at least one element from the group consisting of chromium and uranium in an aggregate quantity corresponding on a mol basis to an addition of about 0.1 to 1.5 weight percent of chromium oxide.

2. A novel composition of matter consisting essentially of lead zirconate and lead titanate effectively in solid solution in a mol ratio of from 60:40 to 45:55, and containing, as a substituent for an equivalent amount of lead therein, from zero to 20 atom percent in the aggregate of at least one alkaline earth metal selected from the group consisting of calcium and strontium, and further containing, in oxidic form at least one element from the group consisting of chromium and uranium in an aggregate quantity corresponding on a mol basis to an addition of about 0.1 to 1.5 weight percent of chromium oxide.

3. A transducer element composed primarily of ferroelectric lead zirconate titanate ceramic containing at least one element from the group consisting of chromium and uranium, in an aggregate quantity equivalent to from 4 to 65 atoms of said elements per 1000 atoms of lead, including substitutional atoms replacing lead.

4. As a novel composition of matter, a solid solution consisting essentially of lead zirconate and lead titanate in a mol ratio of about 55:45 to 50:50 and about 0.1 to 1.5 weight percent of chromium oxide computed as $Cr_2O_3$.

5. As a novel composition of matter, a solid solution consisting essentially of lead zirconate and lead titanate in a mol ratio of about 55:45 to 50:50; about 0.1 to 1.5 weight percent of $Cr_2O_3$; and a quantity of lead oxide (PbO) not exceeding the stoichiometric proportion necessary to balance said $Cr_2O_3$ as $PbCrO_4$.

6. A dielectric ceramic body formed of a solid solution consisting essentially of electromechanically sensitive lead zirconate titanate and containing at least one element from the group consisting of chromium and uranium, in an aggregate quantity corresponding on a mol basis to an addition of about 0.1 to 1.5 weight percent of chromium oxide.

7. A dielectric ceramic body according to claim 6 wherein up to 20 atom percent of the lead in the lead zirconate titanate is replaced by an equivalent quantity of at least one alkaline earth element selected from the group consisting of strontium and calcium.

8. A dielectric ceramic body formed of a solid solution consisting essentially of electromechanically sensitive lead zirconate titanate and containing from 0.1 to 1.5 weight percent of chromium oxide computed on the basis of $Cr_2O_3$.

9. A dielectric ceramic body formed of a solid solution consisting essentially of electromechanically sensitive lead zirconate titanate and containing a quantity of uranium oxide corresponding on a mol basis to about 0.1 to 1.5 weight percent chromium oxide ($Cr_2O_3$).

10. A ceramic composition consisting essentially of lead zirconate titanate in a zirconate to titanate mol ratio of about 53:47 to 54:46, and about 0.75 weight percent of chromium oxide.

11. A ceramic composition according to claim 10 in which about 5 to 10 atom percent of the lead in the lead zirconate titanate is replaced by an equivalent amount of strontium.

12. A ceramic composition according to claim 10 in which about 5 to 10 atom percent of the lead in the lead zirconate titanate is replaced by an equivalent amount of calcium.

13. A ceramic composition consisting essentially of lead zirconate titanate, in a zirconate to titanate ratio of about 54:46, and about 1 weight percent of uranium oxide ($U_3O_8$).

14. A ceramic composition consisting essentially of $Pb_{0.95}Sr_{0.05}(Zr_{0.53}Ti_{0.47})O_3$, about 0.75 percent by weight of chromium oxide, and a finite quantity of lead oxide not exceeding the stoichiometric proportion necessary to balance said chromium oxide as lead chromate.

15. A ceramic composition consisting essentially of $Pb_{0.95}Ca_{0.05}(Zr_{0.53}Ti_{0.47})O_3$, about 0.75 percent by weight of chromium oxide, and a finite quantity of lead oxide not exceeding the stoichiometric proportion necessary to balance said chromium oxide as lead chromate.

References Cited in the file of this patent

UNITED STATES PATENTS

| 2,108,544 | Mayer | Feb. 15, 1938 |
| 2,708,244 | Jaffee | May 10, 1955 |
| 2,731,419 | Goodman | Jan. 17, 1956 |
| 2,906,710 | Kulcsar et al. | Sept. 29, 1959 |

FOREIGN PATENTS

| 574,577 | Great Britain | Jan. 11, 1946 |